US010339218B1

(12) United States Patent
Lakshmanan

(10) Patent No.: US 10,339,218 B1
(45) Date of Patent: Jul. 2, 2019

(54) CUSTOMIZING DISPLAY OF CONTENT RELATED TO DICTIONARY ENTRIES

(71) Applicant: Amazon Technologies, Inc., Seattle, WA (US)

(72) Inventor: Geetika Tewari Lakshmanan, Winchester, MA (US)

(73) Assignee: Amazon Technologies, Inc., Seattle, WA (US)

( * ) Notice: Subject to any disclaimer, the term of this patent is extended or adjusted under 35 U.S.C. 154(b) by 31 days.

(21) Appl. No.: 14/667,132

(22) Filed: Mar. 24, 2015

(51) Int. Cl.
*G06F 17/27* (2006.01)
*G06F 17/20* (2006.01)

(52) U.S. Cl.
CPC .................. *G06F 17/2735* (2013.01)

(58) Field of Classification Search
CPC .. G06F 17/2735; G06F 3/0482; G06F 3/0483; G06F 3/0488; G06F 3/04842; G06F 17/30011; G06F 17/3064; G06F 17/30014; G06F 17/30657; G06F 3/04817; G06F 15/0291; G06F 17/2235; G06F 17/21; G06F 17/211; G06F 17/212
USPC ...... 704/1–10; 715/776, 205, 206, 207, 234, 715/243, 273
See application file for complete search history.

(56) References Cited

U.S. PATENT DOCUMENTS

| | | | |
|---|---|---|---|
| 8,477,109 B1* | 7/2013 | Freed ...................... | G06F 3/041 345/173 |
| 9,557,884 B2* | 1/2017 | Breger ................ | G06F 3/04817 |
| 2008/0059910 A1* | 3/2008 | Buchheit ............... | G06F 3/0482 715/848 |
| 2008/0229182 A1* | 9/2008 | Hendricks ........... | G06F 17/2235 715/205 |
| 2011/0246175 A1* | 10/2011 | Yi ....................... | G06F 17/2827 704/3 |
| 2011/0261030 A1* | 10/2011 | Bullock .............. | G06F 15/0283 345/204 |
| 2014/0089947 A1* | 3/2014 | Han .................... | G06F 9/44505 719/328 |
| 2015/0026176 A1* | 1/2015 | Bullock .............. | G06F 17/3064 707/736 |
| 2015/0227509 A1* | 8/2015 | Landau ................. | G06F 17/289 704/2 |

FOREIGN PATENT DOCUMENTS

EP           2194462 A1 *   6/2010   ......... G06F 17/2735

* cited by examiner

*Primary Examiner* — Dwayne D Bost
*Assistant Examiner* — Stephen M Brinich
(74) *Attorney, Agent, or Firm* — Lee & Hayes, P.C.

(57) ABSTRACT

Techniques for customizing a display of content related to dictionary entries are described herein. In one example, a user selects a word from a rendered electronic book. In response, the device outputs a dictionary user interface that includes display elements associated with a particular user. Preferences of a user may be utilized to determine what content (e.g., what display elements) to display within the dictionary UI as well as how the content is to be displayed. The preferences may be user-specified and/or learned from user behavior. For instance, a machine learning mechanism may be used to determine what content is the most interesting to a user.

23 Claims, 10 Drawing Sheets

CUSTOMIZING DISPLAY OF CONTENT RELATED TO DICTIONARY ENTRIES

BACKGROUND

A large and growing population of users is consuming digital content items on a varying array of electronic devices. These electronic devices include dedicated electronic book reader devices, smartphones, desktop computers, laptop computers, personal digital assistants (PDAs), tablet computing devices, and the like. While consuming content on these devices, users may access a dictionary stored on or accessible by the devices. For instance, when reading an electronic book on an electronic book reader, a user may request to view a definition of a word. In response to the request to view the definition of the word, the device may display a definition of the word from a dictionary along with other content. For example, the device may display sample sentences, grammatical notes, and other words that are related to the selected word. In some cases, however, the user may quickly forget the meaning of the word they looked up.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
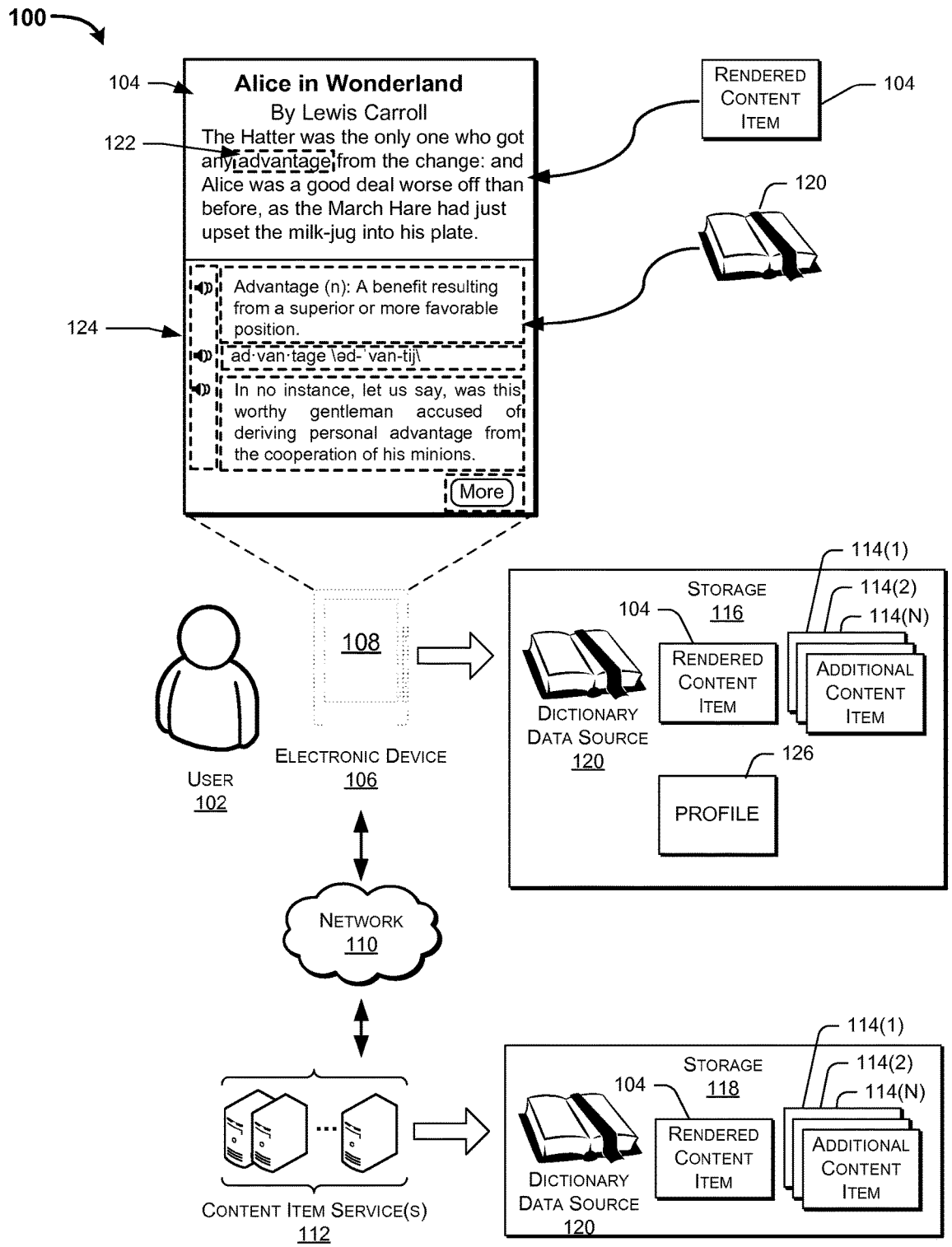
FIG. 1 illustrates an example architecture for customizing the display of content related to dictionary items.

The following detailed description is directed to techniques for customizing the display of content related to dictionary entries on an electronic device. Utilizing the techniques described herein, the display of content associated with a dictionary entries on an electronic device may be customized for a user.

In some examples, a dictionary user interface ("UI") may be customized to display different types of content and/or to format the content differently for individual users. For example, different display elements may be displayed within the dictionary UI for individual users. The term "display element" may refer to a user interface element used to provide or indicate content related to the selected word. By outputting the content that is associated with a particular user, the techniques may aid the user in better understanding the meaning or context of the selected word.

In some configurations, when a user consumes (e.g., reads, listens to, etc.) a content item on an electronic device, the user may select a portion of the content item for the purpose of learning additional information about the selected portion. For example, the user may select a word found within the content item. In response to receiving the selection, information about the selection may be obtained. For instance, definitions of the word may be retrieved from a dictionary, an encyclopedia, a thesaurus, or some other content source. Other data might also be obtained. For example, sample sentences, grammatical notes, related words, translations of the word(s), and the like might be obtained.

In some configurations, preferences of a user may be utilized to determine the content (e.g., what display elements) to display within the dictionary UI as well as how the content is to be displayed. For instance, the dictionary UI may be configured to display one definition of a word and an example sentence to a first user and be configured to display two definitions of the word without an example sentence to another user. The preferences may be user-specified and/or learned from user behavior and may be stored in a profile that is associated with a user.

Generally, the settings may be specified such that only the content the user is interested in consuming is provided to the user when the dictionary UI is displayed. In this way, the content that is displayed may be customized to how the user learns best. As such, the user may be more likely to remember the word they looked up. For instance, one user may learn best by hearing the dictionary definition of a word. In this case, the dictionary UI may be configured to provide a link to the sound file of the spoken word without displaying other data, such as a textual definition of the word, sample sentences, grammatical information, and the like. Other users may configure the dictionary UI differently. For example, a user may prefer to view a textual definition of the word, along with graphical content (e.g., a picture or video) that relates to the word. In this example, the dictionary UI may be configured to display the textual definition of the word along with a picture related to the word without displaying other data.

As another example, the dictionary UI may be configured to display one or more sample sentences of the word. In this case, the sample sentence shown within the dictionary UI for a selected word may be identified from content that the user has previously read. For instance, assume the user selects the word "wonder" within a content item currently being consumed. The techniques may attempt to locate "wonder" within other content items. If the user has recently read Alice in Wonderland, then a sample sentence for "wonder" may be obtained from Alice in Wonderland (e.g., "Alice looked in wonder at the door, and thought . . . "). In this situation, since the definition is linked to a story read by the user, the user may be more likely to remember it.

In addition to determining the content to display within the dictionary UI, the way the content is displayed or formatted within the dictionary UI may be specified for individual users. For example, the color or formatting of the text of the dictionary user interface might be configured differently by different users. Similarly, the background colors and images utilized by the dictionary user interface may be configured for particular users.

In some configurations, the dictionary UI may be configured on behalf of the user. For instance, machine learning mechanisms may be utilized to determine what content the user typically views or selects from the dictionary UI. The machine learning mechanism may update the content displayed for a particular user over time. For instance, as the user continues to interact with the dictionary UI, these interactions may be utilized by the machine learning mechanism to update the displayed content. In other configurations, the users may specify the content to include within the dictionary UI as well as the formatting to apply to the selected content. According to some examples, the settings associated with the content to display within the dictionary UI and the formatting of the content is stored within a profile associated with a particular user.

One profile may specify the use of light colors, and a limited use of text, whereas another profile may specify the use of bold colors, and specify the use of a lot of text within the dictionary UI. A profile of the user utilizing an electronic device may be accessed before displaying the dictionary UI. As such, the user is presented with content related to a selected word that may be more relevant to how the user learns as compared to displaying the same content in the same manner to each user.

While a few example factors have been listed, the techniques may take into account any other factor or combination of factors when determining what content to display, as well as how to display the content on the electronic device, and a manner (e.g., order, style, etc.) in which to output the content. For instance, the techniques may take into account information associated with the user (e.g., age, preferences, etc.), information associated with similar users, a geographical location of the device (e.g., determined via triangulation or global positioning satellites (GPS)), and/or the like.

The claimed techniques are described below with reference to an example architecture. However, it is to be appreciated that a number of other architectures may also employ these techniques.

Example Architecture

FIG. 1 illustrates an example architecture 100 for customizing the display of content related to dictionary items. As illustrated, a user 102 reads a content item 104 displayed on an electronic device 106. In this example, the user 102 requests to view a definition a word found within the content item 104 and, in response, the device 106 displays content that is related to the word. For instance, the content may include, but is not limited to a definition of the word, a part of speech for the word, a pronunciation of the word, a translation of the word, example sentences, audio, video, graphical, how often the definition is used within a language, and the like.

As illustrated, the electronic device 106 includes a display 108 upon which electronic content such as content items or electronic books may be rendered. The terms content, content item, and electronic book include essentially any form of electronic data that may be consumed on a device, including textual and verbal works comprising sequences of words such as digital books, audio books, electronic magazines, papers, journals, periodicals, documents, instructional materials, course content, website content, music, movies, and so on. In other examples, the user 102 may employ electronic devices that do not include a display, but rather include speakers or another output device for outputting audio or the like.

As such, the electronic device 106 may comprise a desktop computer, a laptop computer, or any other type of electronic device. In some instances, the electronic device 106 may be a handheld or other small, light-weight, portable device upon which electronic books and other content can be rendered and conveniently viewed in a manner similar to viewing a paper book. Examples of electronic book readers include flat form-factor devices such as tablets, pads, smartphones, personal digital assistants (PDAs), and the like, as well as other types of electronic devices configured to render electronic books (e.g., personal computers, laptop computers, etc.).

In some examples, the electronic device 106 may comprise a dedicated-purpose electronic book reader device, having a flat-panel display and other characteristics that mimic the look, feel, and experience offered by paper-based books. For example, such an electronic book reader devices may have a high-contrast flat-panel display that appears similar to a printed page and that persist without frequent refreshing. Such displays may consume negligible amounts of power, so that the electronic book reader devices may be used for long periods without recharging or replacing batteries.

In the example of FIG. 1, the electronic device 106 has networking capabilities. For example, the electronic device 106 may have a wireless communication interface that allows communication though a network 110. The wireless communications interfaces may utilize Wi-Fi, cellular, or other wireless data and networking technologies. The network 110 may be any type of communication network, including a local-area network, a wide-area network, the Internet, a wireless network, a wide-area network (WAN), a cable television network, a telephone network, a cellular communications network, combinations of the foregoing, etc.

In the described example, the electronic device 106 includes non-volatile storage capabilities so that electronic content items can be downloaded and stored in their entirety on the device. In some instances, once an electronic book has been stored by an electronic reader, it can be displayed and read at any time, whether or not the electronic reader is connected to a network. In other examples, meanwhile, the device may stream or otherwise receive content items on-demand.

In the configuration illustrated by FIG. 1, the electronic device 106 may obtain content items from a content item service 112 and/or from any other service. The service 112 and other services may be accessed using the networking capabilities of the electronic device 106. The service 112 and the other services may be accessible through other means as well, such as by connection to intermediary devices like personal computers, different types of mobile devices, and so forth.

In FIG. 1, the content item service 112 is illustrated as a network-based or cloud-based service, available over a public network such as the Internet. The electronic device 106 may be configured to allow the user 102 to conveniently browse for content and content items from the service 112, and to purchase and download selected content items from the service 112.

Various applications and user interfaces may be used in conjunction with the electronic device 106 to interact with the service 112, such as Internet browser programs that allow a user to interactively engage different online services. In addition, the service 112 may expose lower-level interfaces or APIs (application programming interfaces) through the network 110, through which devices and programs can access the underlying functionality of the service 112 without direct user interaction.

The service 112 might be implemented in some examples by an online merchant or vendor. Electronic books and other electronic content might be offered for sale by such an online merchant, or might be available to members or subscribers for some type of periodic or one-time fee. In some circumstances, electronic books or other content might be made available without charge. In either instance, the service 112 may include a client interface through which the electronic device 106 and other devices interact with the service 112. The client interface may include a virtual storefront or other type of online interface for interaction with consumers and/or devices. The client interface may expose a graphical, web-based user interface that can be accessed by human users to browse and obtain (e.g., purchase, rent, lease, etc.) content items such as electronic books. The client interface may also expose programmatic interfaces or APIs that entities and devices can use to obtain digital content items and related services.

In the illustrated example, the user 102 may have utilized the web-based user interface or the APIs to obtain the content item 104 being rendered on the display 108. In addition, the user 102 may have also obtained one or more additional content items 114(1), 114(2), . . . , 114(N) from the service 112 or another service, as illustrated in FIG. 1. In some instances, the electronic device 106 may include non-volatile storage 116 that stores the currently-rendered content item 104 and the additional content items 114(1)-(N), while in other instances these items may be stored remotely from the electronic device. For instance, the content item service 112 may store, in non-volatile storage 118, these items in association with an account of the electronic device 106 and/or the user 102. Furthermore, in some instances, the electronic device 106 may locally store a portion of the content items previously acquired by the user, while the service 112 (or another remote entity) may store, in an account of the user 102 or the device 106, other content items that the user 102 has previously acquired.

Furthermore, FIG. 1 illustrates that the electronic device or the content item service 112 may store one or more dictionary data sources 120 that are accessible to the electronic device 106. The dictionary data sources 120 may include a dictionary, thesaurus, encyclopedia, additional content items 114, and/or any other type of dictionary or combination of data sources. In the illustrated example, the dictionary data source 120 includes definitions that may be output in response to the user 102 selecting corresponding words within a rendered content item, such as the currently-rendered content item 104. As with the other items discussed above, the electronic device 106 may store the dictionary data source 120 locally, or the electronic device 106 may access the dictionary data source 120 at the service 112 or another remote entity (e.g., over the network 110).

As illustrated, the user 102 may select one or more words and may request information associated with these word(s) from the dictionary data source 120. In this example, for instance, the user 102 is shown to have selected the word "advantage" from within the content item 104. In this example, FIG. 1 illustrates the selected word 122 using an indicator represented by the dashed line around "advantage". In response to the selection of the word "advantage", the electronic device 106 may determine what content to display in response to receiving the selection of the word. Here, the device 106 is shown to display content within a dictionary UI 124. In the current example, the dictionary UI 124 is illustrated as being part of the same graphical window as the display of the content item 104. In other examples, as illustrated in FIGS. 3A-3F, the dictionary UI 124 is illustrated as a window that appears over the display of the rendered content item 104.

In the current example, the dictionary UI 124 includes different types of display elements (as indicated by the dashed lines within the dictionary UI 124). As discussed in more detail below, the display elements that are included within the display of the dictionary UI may include many different types of display elements. In the example illustrated in FIG. 1, the display elements selected for display in the dictionary UI 124 include a display element to display definition for the word "advantage", and a display element to display a phonetic representation of the selected word. The UI 124 also includes a display element to display an example sentence utilizing the selected word, a display element to display a part of speech for the word, and a display element that displays an icon that may be selected to hear audio data (e.g., an audio file or some other data source) that corresponds to the displayed content. As will be described in more detail below, the display elements included within the UI 124 may be different for different users.

In the current example, the display 108 illustrates an example sentence from within the additional content items 114(1)-(N) that includes the word "advantage." In some configurations, the device 106, or some other device, may identify multiple sentences that includes the use of the selected word. In these cases, the device 106 may rank the sentences and output one or more of the sentences based on the ranking. For instance, if the device 106 identifies one hundred such sentences, the device 106 may rank and select a single sentence or any other number of sentences for display.

As illustrated, in this example the device 106 has outputted a sentence that includes the word "advantage" and that resides in one of the content items 114(1)-(N) accessible to the electronic device 106. Therefore, as opposed to traditional dictionaries that may output a static sentence that is common for each user that requests information about a particular word, the techniques described herein allow for an example sentence to be dynamically selected from items that are associated with the user and that are separate from the dictionary data source 120. Here, for instance, the electronic device 106 outputs a sentence from "The Three Musketeers", which the user 102 has previously obtained and has read. By providing a sentence from a content item that the particular user of the device 106 has obtained, the user is more likely to understand and appreciate the displayed sentence. In turn, the user is more likely to understand and appreciate the meaning and/or context of the initially-selected word (here, "advantage").

The additional content items 114(1)-(N) from which the sentences are displayed may comprise an assortment of different sources. The items 114(1)-(N) may include, for instance, books, periodicals, website content, movie quotes or content, posts from social networking sites, blogging sites, microblogging sites, and the like. In some examples, the additional content may include translations of the word, definitions and/or other content that is displayed within the dictionary UI 124.

In addition, the device may dynamically select or obtain content from some data sources or content items that are not stored on the device 106 or at the service 112, but that are otherwise associated with the user 102 or the device. For instance, if the user 102 often browses to a particular website using the device 106 (and/or has marked this website as a "favorite"), then the device 106 may identify and pull sentences from this website. In yet another example, if the user 102 has expressed an interest in a particular movie (e.g., by rating the movie, etc.), then the device 106 may identify and pull movie quotes from this movie. While a few examples have been listed, it is to be appreciated that the device 106 may identify and dynamically select sentences from any type of source that is somehow associated with the user 102 or the device 106.

In some configurations, an index might be created using the additional content items 114 and/or data from other data sources. For example, the electronic device 106, the content item service 112, or some other component or device, might generate an index that may be used to quickly locate content items that include a selected word (e.g., "advantage"). In some examples, the index may be searched using the selected word to identify the content items 114 that include the word. According to some configurations, data that is selected to be included within the UI 124 may be based on a number of times the word occurs in a content item, a last time the content item was accessed, a number of times the content item was accessed, and the like. For example, an example sentence may be chosen from a content item determined to be the most frequently accessed content item accessed by the user within a particular time period.

As briefly discussed above, the user may specify settings that are utilized by the electronic device to determine what content to display. For instance, the user may specify to display the most common definition of the word and nothing else. These settings may be stored within a profile 126 that is associated with one or more users. For example, each user may have a separate profile 126. Generally, a user may configure the settings within the profile 126 such that only the content the user is interested in consuming is provided to the user. In this way, the dictionary UI 124 may be customized to how the user learns best. As such, the user may be more likely to remember the entry they looked up.

In addition to determining the content to display within the dictionary UI, the way the content is displayed within the dictionary UI may be configured for particular users. For example, the color or formatting of the text of the dictionary user interface might be configured differently for different users. Similarly, the background colors and images utilized by the dictionary user interface may be configured. Generally, the way that the content is displayed may be configured for different users.

In some configurations, the dictionary UI 124 may be configured on behalf of the user. For instance, machine learning techniques may be utilized to determine what content the user typically views or selects from the dictionary UI. The term "machine learning" may refer to one or more programs that learns from the data it receives. For example, a machine learning mechanism may build, modify or otherwise utilize a model that is created from example inputs and makes predictions or decisions using the model. In the current example, the machine learning mechanism may be used to improve the identification of content (e.g., display elements) to display within the dictionary UI 124. The model may be trained using supervised and/or unsupervised learning. For instance, over time as the machine learning mechanism receives more data, the content to display within the UI 124 may change based on actual data associated with one or more users that is received.

Different machine learning mechanisms may be utilized. For example, a classification mechanism may be utilized to determine the display elements to include within UI 124. The classification mechanism may classify the display elements into different categories that provide an indication of whether the display element will be utilized by a particular user. For example, the display elements may be classified into a first category (e.g., not likely to be utilized by the user) and a second category (e.g., likely to be utilized by the user). In some configurations, more classification categories may be utilized. In other examples, a statistical mechanism may be utilized to determine the display elements to include within the UI 124. For example, a linear regression mechanism may be to generate a score that indicates a likelihood that the display element will be selected by a user. Linear regression may refer to a process for modeling the relationship between one variable with one or more other variables. Different linear regression models might be used to calculate the score. For example, a least squares approach might be utilized, a maximum-likelihood estimation might be utilized, or another approach might be utilized.

In some configurations, the weighting of parameters utilized by a machine learning mechanism may be adjusted. For example, the display elements to include within the UI 124 for a particular user may be determined based upon one or more of a number of previous selections of a display element by the user (or similarly situated users), preferences indicated by a user, languages utilized by the user, or some other metric. Adjusting the weighting of different parameters within the machine learning mechanism may cause some parameters to be more influential in determining the display elements to include within the UI 124 as compared to other parameters that might be used by the machine learning mechanism.

In some instances, the user may be presented with different options from which they may select (now shown). For example, a user may select the content (e.g., the display items) to include within the dictionary UI 124 as well as the content to exclude from the dictionary UI 124. In some configurations, the user may also specify the formatting to apply to the content displayed within the dictionary UI 124. For instance, one user specify to include multiple definitions of a selected word, multiple sentences that utilize the word, and a part of speech. The user might also specify to use light colors. Other users may configure the dictionary UI 124 differently.

Example Electronic Reader

Figure 2:
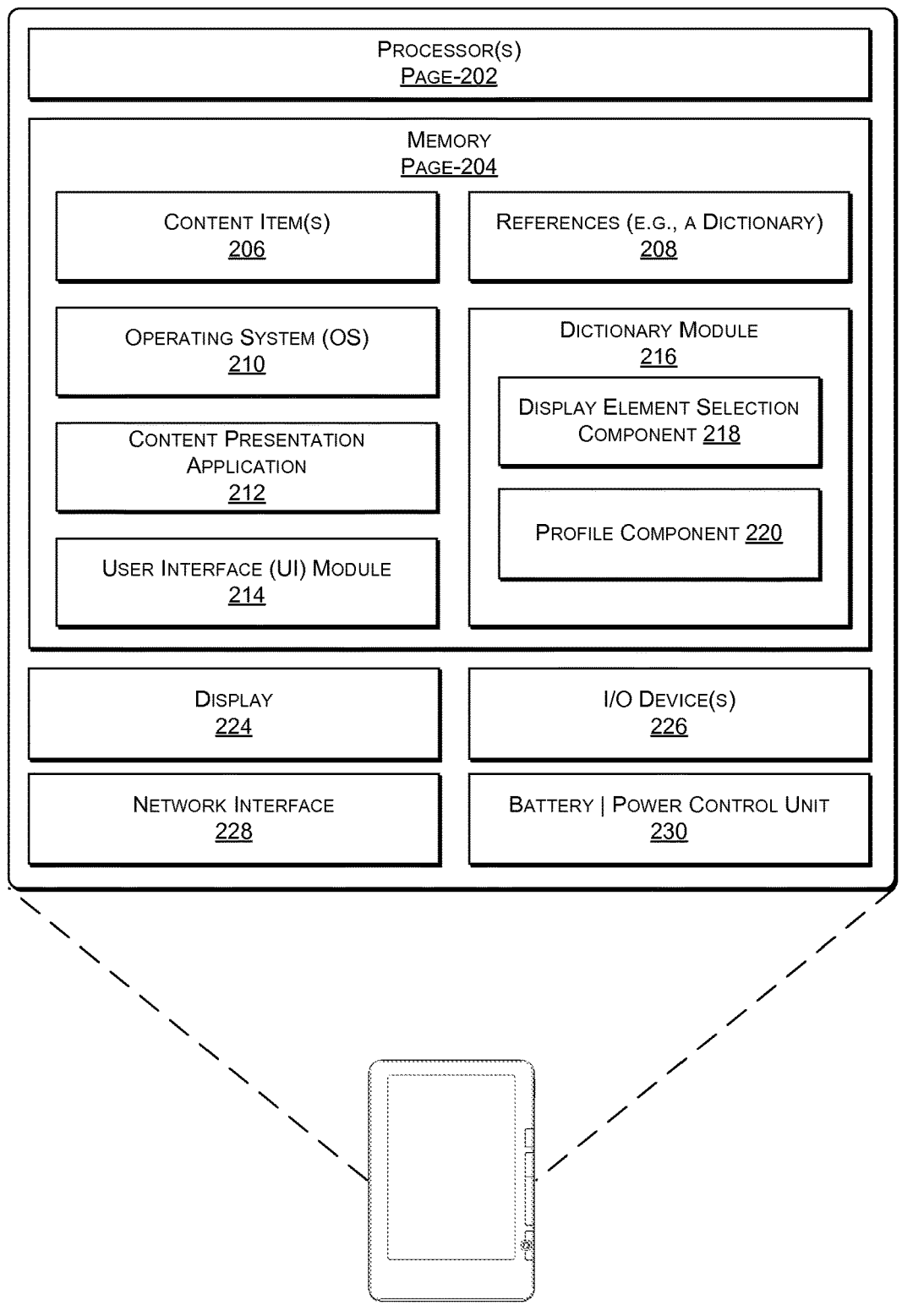
FIG. 2 illustrates relevant components of the example electronic device of FIG. 1.

FIG. 2 is a high-level block diagram showing an example of the electronic device 106, indicating components that are relevant to this discussion. In this example, the electronic device 106 is a dedicated electronic book reader device, designed specifically for the purpose of emulating a traditional book-like reading experience. To that end, it is has a size and weight that is comparable to a paper-based book, and uses a monochrome display having a contrast ratio that approaches that of the printed page. Of course, as discussed above, the electronic device 106 may comprise any other type of device in other instances.

In a very basic configuration, the electronic device 106 includes one or more processors 202 and memory 204. Depending on the configuration of the electronic device 106, the memory 204 may be a type of computer storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the electronic device 106.

The memory 204 may be used to store any number of functional components that are executable on the processors 202. In many examples, these functional components comprise instructions or programs that are executable by the processors 202 and that implement operational logic for performing the actions attributed above to the electronic device 106. In addition, the memory 204 may store various types of data that are referenced by executable programs. Furthermore, it is noted that while the components described below are illustrated as residing on the device 106, in some examples some or all of these components may reside remote from the device 106. For instance, some or all of these components may reside on the content item service 112 and/or another server that may perform some or all of the operations described herein.

As discussed above, the memory 204 may store one or more content items (e.g., the content item 104 and the additional content items 114(1)-(N), illustrated in FIG. 1), as well as one or more references 208 (e.g., the dictionary data source 120 illustrated in FIG. 1). The memory 204 may also store an operating system 210, a content presentation application 212, and a user interface (UI) module 214. The content presentation application 212 may function to output content on the device. For instance, the application 212 may display visual content on a display, audible content on a speaker, and the like.

The UI module 214, meanwhile, facilitates user operation of the electronic device 106. For instance, the UI module 214 may provide menus and other navigational tools to facilitate selection and rendering of content items. The UI module 214 may further include a browser or other application that facilitates access to sites over a network, such as websites or online merchants, or other sources of electronic content items or other products.

The memory 204 may further store an example dictionary module 216. The dictionary module 216 functions to select the content to output on the device 106 in response to the UI module 214 receiving an indication that that a user of the device 106 has selected a particular portion of a rendered content item. As illustrated, the dictionary module 216 includes a display selection component 218, and a profile component 222.

In response to a user of the device 106 selecting a particular portion of content from a content item (e.g., the word "advantage"), the display element selection component 218 identifies display elements (e.g., definitions, parts of speech, example sentences, audio elements, translations, and the like) to output to the device. In some configurations, the component 218 may query the profile component 220 to obtain profile data that is associated with the user of the device 106. For example, the profile component 220 may access the profile 126 illustrated in FIG. 1 to determine the content to display within the dictionary UI 124. In some instances, the display element selection component 218 may access one or more dictionaries, as well as other content items that are located within content items that a user of the device has previously acquired and, hence, content items that are stored on or accessible by the device 106.

For example, the display element selection component 218 may identify sentences that include the word "advantage" from content items that a user of the device 106 has previously obtained. In some instances, these content items are stored in the memory 204. In other instances, these content items are stored in a remote account associated with the device. In other instances, meanwhile, these items comprise items that the device or the user account previously stored, but do not currently store (e.g., old versions of a periodical that have been removed from storage due to age).

The profile component 220 may receive input from the user 102 indicating what content to display in a dictionary UI. In other examples, the profile component 220 may programmatically determine what content to display in the dictionary UI. For instance, the profile component 220 may utilize a machine learning mechanism to determine (based on previous selections by the user or similar users) what content to display on the device 106. The previous selections made by a user may be stored on the device 106 and/or at some other location (e.g., the content item service 112). The profile component 220 may also provide a user interface, or some other mechanism, to a user to receive the settings associated with the dictionary UI 124. In some configurations, the profile component 220 may identify graphical content to display within the dictionary UI 124 from graphical content stored by the user. For example, pictures and videos displayed within the dictionary UI 124 might be pictures or videos that were taken by the user.

In some configurations, the display element selection component 218 determines how often a word is utilized within a language, which may be referred to herein as a "corpus count". In other configurations, the "corpus count" may refer to how often the word is utilized within content associated with the user. For example, the corpus count may be based on how many times a word is included within the content items associated (e.g., owned, rented, borrowed) with the user. The display element selection component 218 may provide an indication of the corpus count within the dictionary UI. One such example is illustrated in display element 302E shown in FIG. 3A. According to some configurations, a user may specify to only display definitions for a word that exceed some specified value. In some examples, the display element selection component 218 may identify the display element types that are preferred by the user and, hence, may prioritize or rank the display of certain display elements over others based on this information.

Once the content (e.g., the display elements) have been selected to be output, the component 218 may output the determined display elements and/or content. The component 218 may output this content visually, audibly, or in any other manner.

As illustrated, the electronic device 106 may further include a display 224 upon which the content items and the selected display elements may be rendered. In one example, the display 224 uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some example electronic paper displays that may be used with the implementations described herein include bi-stable LCDs, MEMS, cholesteric, pigmented electrophoretic, and others. Touch sensitive technology may be overlaid or integrated with the electronic paper display technology to enable user input via contact or proximity to the screen.

The electronic device 106 may further be equipped with various input/output (I/O) devices 226. Such devices may include various user interface controls (e.g., buttons, joystick, keyboard, etc.), audio speaker, connection ports, and so forth. In some instances, a user of the electronic device 106 utilizes one or more of the input devices to select portions of content items rendered on the display 224. The UI module 214 may receive indications of these selections and may in turn pass these indications to the dictionary module 216, which operates as discussed immediately above.

Furthermore, the device 106 may include a network interface 228, which may support both wired and wireless connection to various networks, such as cellular networks, radio, Wi-Fi networks, short range networks (e.g., Bluetooth), IR, and so forth. The network interface 228 facilitates receiving electronic books and other content as described herein.

The electronic device 106 may also include a battery and power control unit 230. The power control unit operatively controls an amount of power, or electrical energy, consumed by the electronic device 106. Actively controlling the amount of power consumed by the electronic device may achieve more efficient use of electrical energy stored by the battery.

The electronic device 106 may have additional features or functionality. For example, the electronic device 106 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Example User Interfaces (UIs)

Figure 3A:
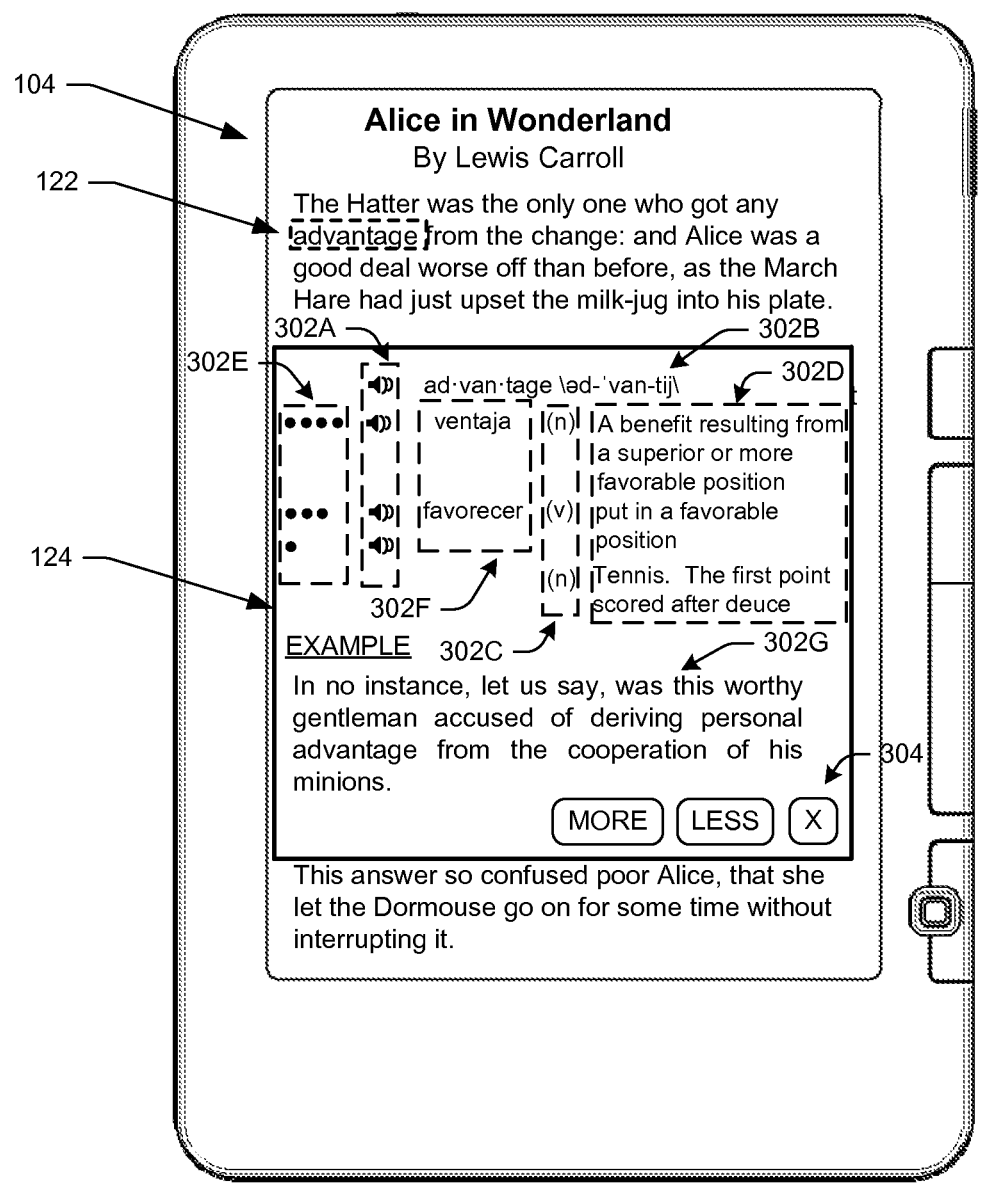
FIGS. 3A-3F illustrate example user interfaces displayed on the electronic device of FIG. 1.

FIG. 3A illustrates an example dictionary user interface (UI) rendered on the electronic device 106 from FIG. 1. This UI includes the content item 104 that the user 102 is currently consuming, the indication of the selected word 122 that the user 102 has selected, and a dictionary UI 124. The user 102 may make this selection via a touch screen, a controller, a joystick, or via any other type of input device.

By selecting this portion of the content item (here, the word "advantage"), the user 102 may be requesting to view information associated with the selected portion of the content item. For instance, the user 102 may request to view content related a selected word in a dictionary, a thesaurus, or the like. In some instances, the selection alone is effective to request this information, while in other instances the user 102 may also select an option from a menu or may otherwise interact with the device 106 to make this request. In this example, the device 106 displays content related to the selected word in the dictionary UI 124.

In this example, the device 106 displays different display elements 302A-302G that are related to the definition of the word "advantage". In some examples, the device 106 utilizes the display element selection component 218 to determine the display elements to include within the dictionary UI 124. According to some configurations, the display element selection component 218 accesses the profile 126 for a user 102 of the electronic device 106 to determine the display elements to display.

As illustrated, the display element 302A is a selectable user interface element (an audio icon) that is associated with audio data. For example, in response to receiving a selection of one of the display elements 302A, corresponding audio data may be played. The audio data may be a definition of the selected word, how to pronounce the selected word, how to pronounce the word in another language, what part of speech the selected word is, an example sentence, and the like.

The dictionary UI 124 may also include a display element 302B that provides a textual phonetic description for the selected word, and a display element 302C that provides a part of speech for the different definitions of the word. In the current example, the dictionary UI 124 also includes a display element 302D that provides one or more definitions of the word, a display element 302E that indicates how often the definition is used within the language, a display element 302F that provides a translation of the selected word and/or translated definitions for the word. According to some examples, the user specifies the language to translate the selected word and/or translated definitions for the word. In other examples, the language to translate the selected word and/or translated definitions for the word may be programmatically determined from content associated with the user. For example, the content may include auditory data made by the user, auditory data listened to by the user, stored data that is in another language as compared to the content item 104, and the like.

Display element 302G provides one or more example sentences that include the selected word. The dictionary UI 124 may also include control elements 304 that may be utilized. In the current example, the control elements 304 include a "More" element, a "Less" element, and an "X" element. The "More" element may be used to obtain more information about the selected word. The "Less" element may be used to remove from the UI 124 some of the displayed elements 302 and the "X" element may be used to close the UI 124.

Here, the device 106 displays a portion of the text from the book "Alice in Wonderland", which the user may have previously downloaded or may be accessing from a remote location. As illustrated, this portion of the text includes the word "advantage" that has been selected by the user 102 as indicated by indicator 122.

As discussed above, the UI 124 may be customized for the user 102 that is utilizing the device 106. In some cases, the user 102 may specify to view all of the display elements 302 that are available for display in the dictionary UI 124. The customizations may be stored in a profile 126. While display elements 302A-302G are shown, more or fewer display elements 302 may be associated with the UI 124. FIGS. 3B-3F illustrate the dictionary UI 124 including fewer display elements 302.

Rather than displaying content that does not change for a user, the dictionary UI 124 may provide an experience that is tailored to the particular user 102 of the device 106. By doing so, the user 102 is more likely to appreciate, understand and remember the selected word.

Figure 3B:
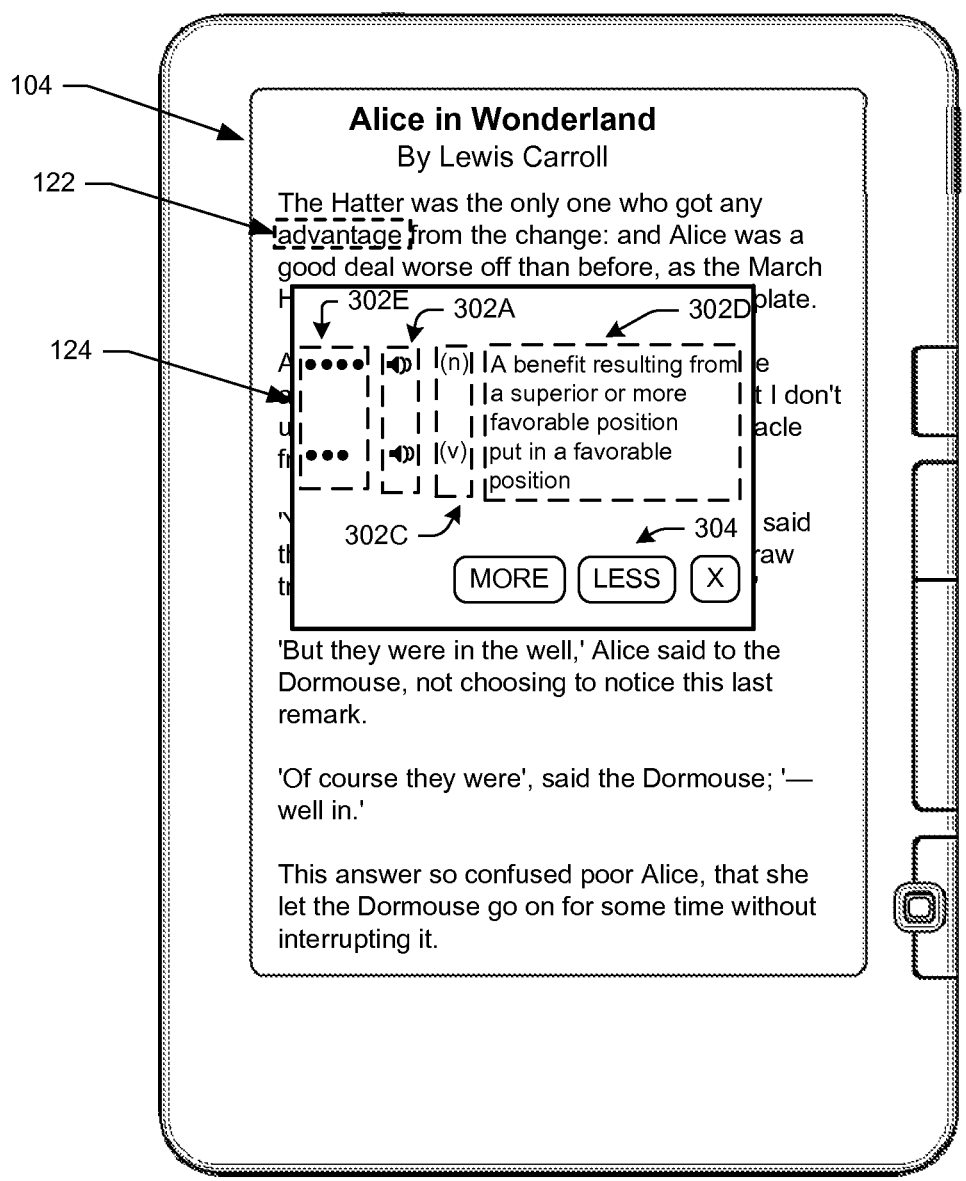

FIG. 3B illustrates an example dictionary user interface 124 customized for a particular user 102. As illustrated, this screen display includes the previously-described definition of the selected word 122, as well as the previously-described dictionary UI 124. Here, however, the dictionary UI 124 includes a display of different display elements 302.

In the current example, FIG. 3B illustrates that the electronic device 106 may change the display of the dictionary UI 124 for a user. As displayed, the dictionary UI 124 includes display elements 302A, 302C, 302D, and 302E but does not include the display elements 302B, 302F and 302G. As previously described, the display elements 302A illustrate selectable user interface elements that when selected play associated audio data. The display element 302C indicates the part of speech for the different definitions of the word. In the current example, the dictionary UI 124 includes the top two definitions as illustrated by display elements 302D for the word "advantage" instead of the three definitions displayed in FIG. 3A. The display element 302E indicates the corpus count for the definitions displayed in display elements 302D. The dictionary UI 124 also includes control elements 304.

As previously described, the display elements 302 that are displayed within the dictionary UI 124 for a user may be determined from a profile 126 that may be configured by the user 102 interacting with the device 106 or determined by the profile component 220.

Figure 3C:
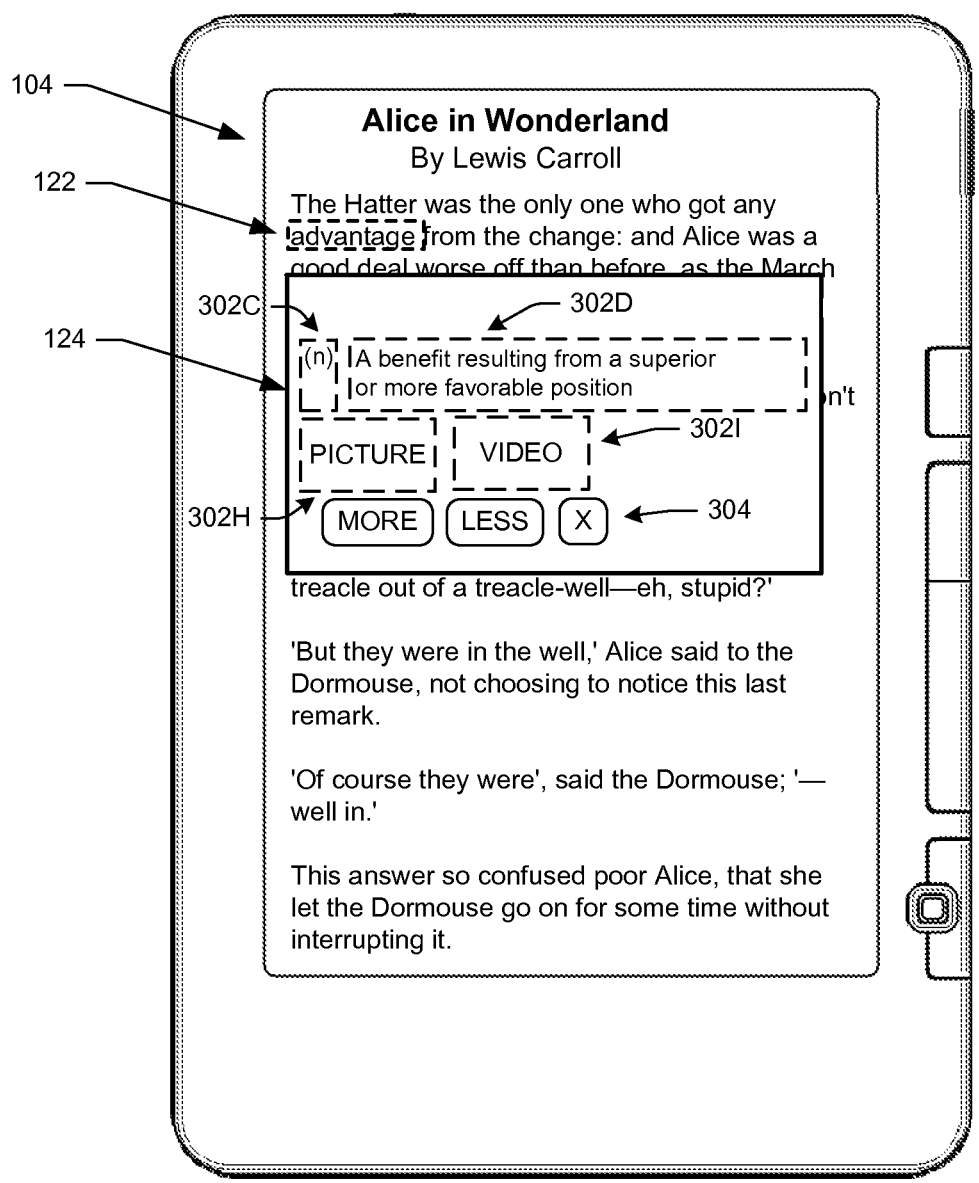

FIG. 3C illustrates another example dictionary user interface 124 customized for a particular user 102. As illustrated, this screen display includes the previously-described definition of the selected word 122, as well as the previously-described UI 124. Here, however, the dictionary UI 124 includes a display of different display elements 302.

In the current example, the dictionary UI 124 includes display elements 302C, 302D, 302H, and 302I but does not include the display elements 302A, 302B, 302E, 302F and 302G as illustrated in FIG. 3A. The display element 302H may be used to display graphical content, such as a picture that is related to the word. The picture associated with the display element 302H may provide the user with a visual definition of the selected word (e.g., advantage). The display element 302I may be used to display graphical content, such as a video that is related to the word. For example, the video might include auditory and graphical content that provides the user with a video definition of the selected word. As previously discussed, the graphical content might be obtained from the user's device 106 and/or from the service 112. The dictionary UI 124 may be displayed by the device 106 utilizing the dictionary module 216.

Figure 3D:
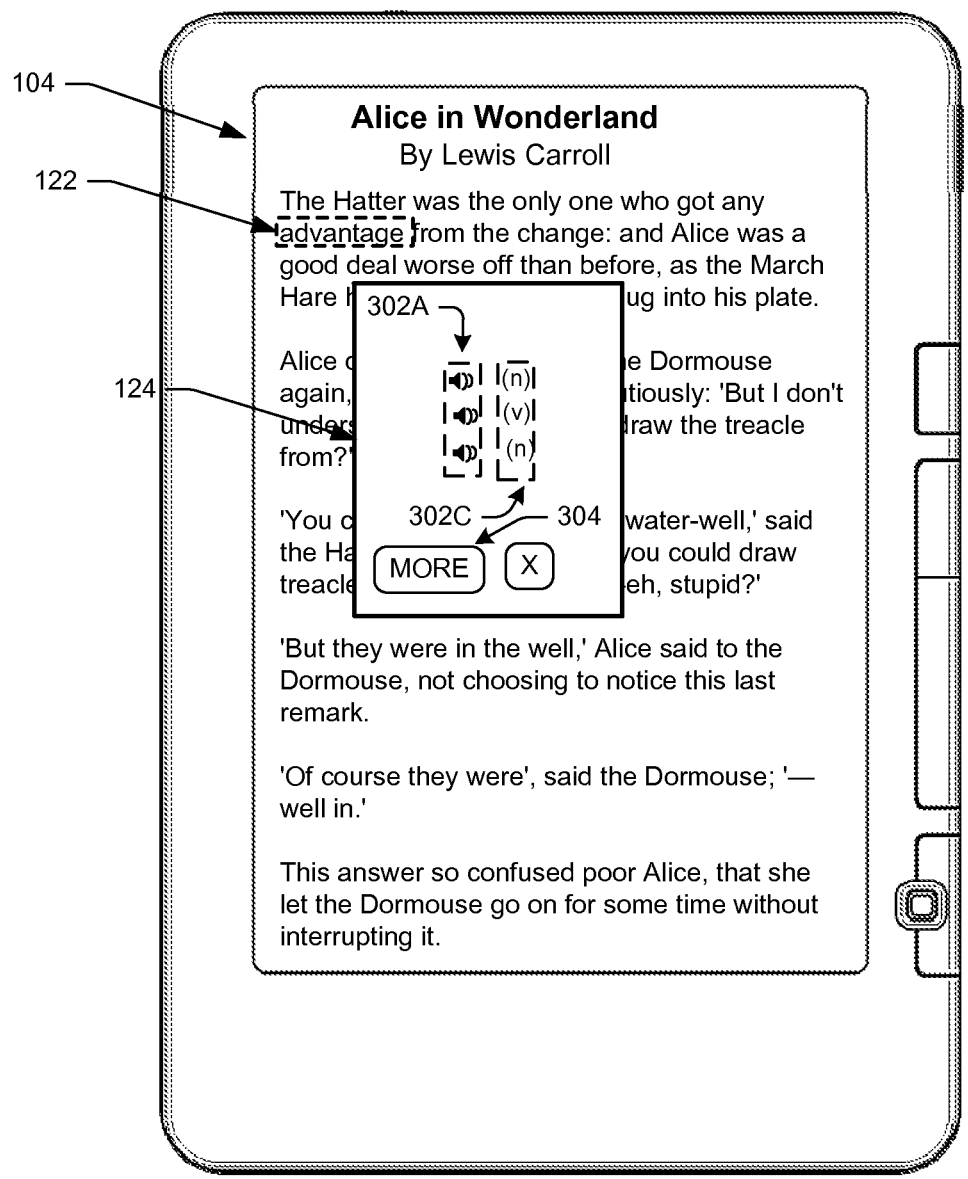

FIG. 3D illustrates another example dictionary user interface 124 customized for a particular user 102. As illustrated, this screen display includes the previously-described definition of the selected word 122, as well as the previously-described dictionary UI 124. Here, however, the dictionary UI 124 includes a display of different display elements 302.

In the current example, the dictionary UI 124 includes display elements 302A and 302C, but does not include the display elements 302B, 302D, 302E, 302F and 302G as illustrated in FIG. 3A. As previously described, the dictionary UI 124 may be displayed by the device 106 utilizing the dictionary module 216.

Figure 3E:
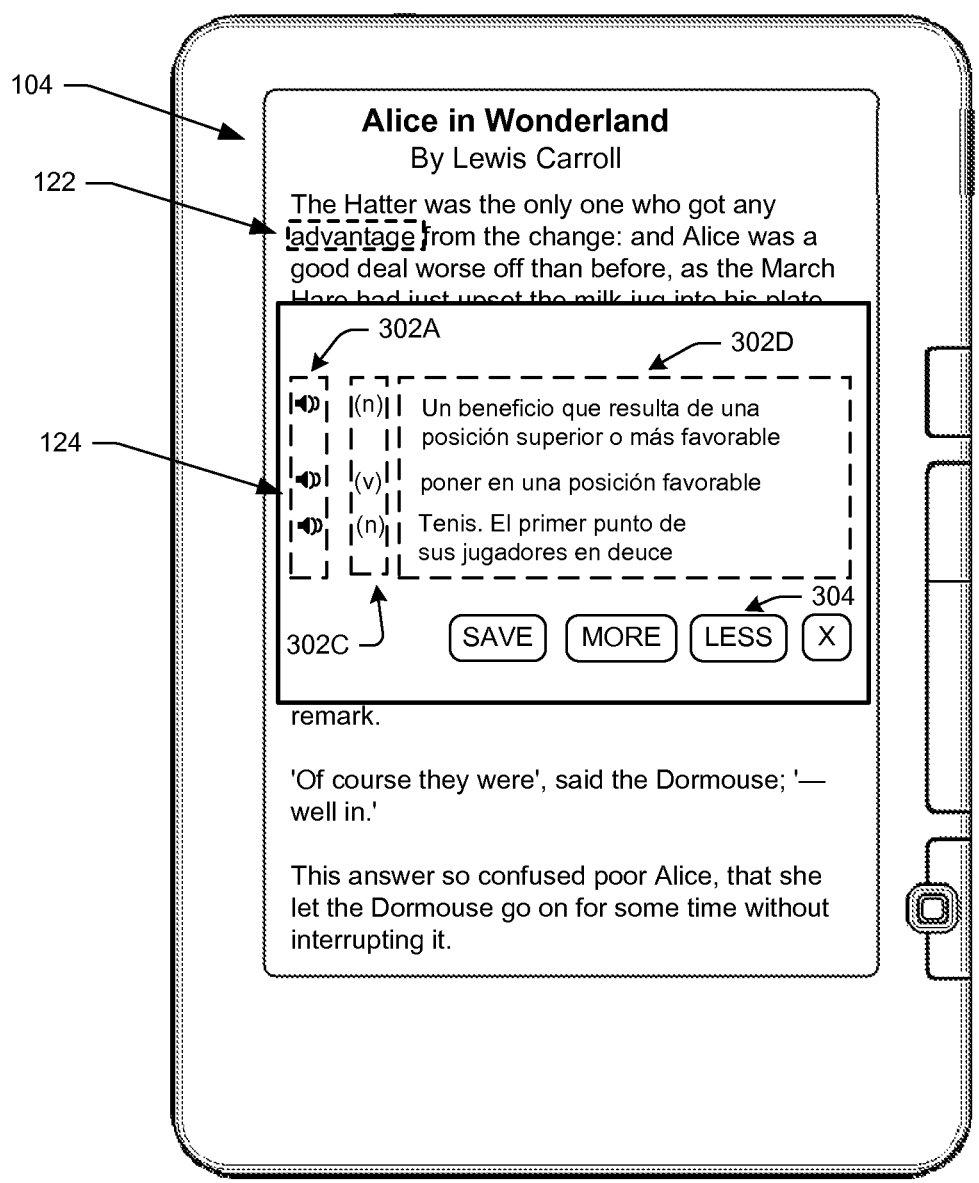

FIG. 3E illustrates another example dictionary user interface 124 customized for a particular user 102. As illustrated, this screen display includes the previously-described definition of the selected word 122, as well as the previously-described UI 124. Here, however, the dictionary UI 124 includes a display of different display elements 302.

In the current example, the dictionary UI 124 includes display elements 302A, 302C and 302D, but does not include the display elements 302B, 302E, 302F and 302G as illustrated in FIG. 3A. In this example, the dictionary UI 124 includes the definitions displayed in a different language as compared to displaying the definitions in English as illustrated in FIGS. 3A-3D. For instance, the user 102 may have specified a setting to display the definitions in their native language (e.g., Spanish). As previously described, the dictionary UI 124 may be displayed by the device 106 utilizing the dictionary module 216.

Figure 3F:
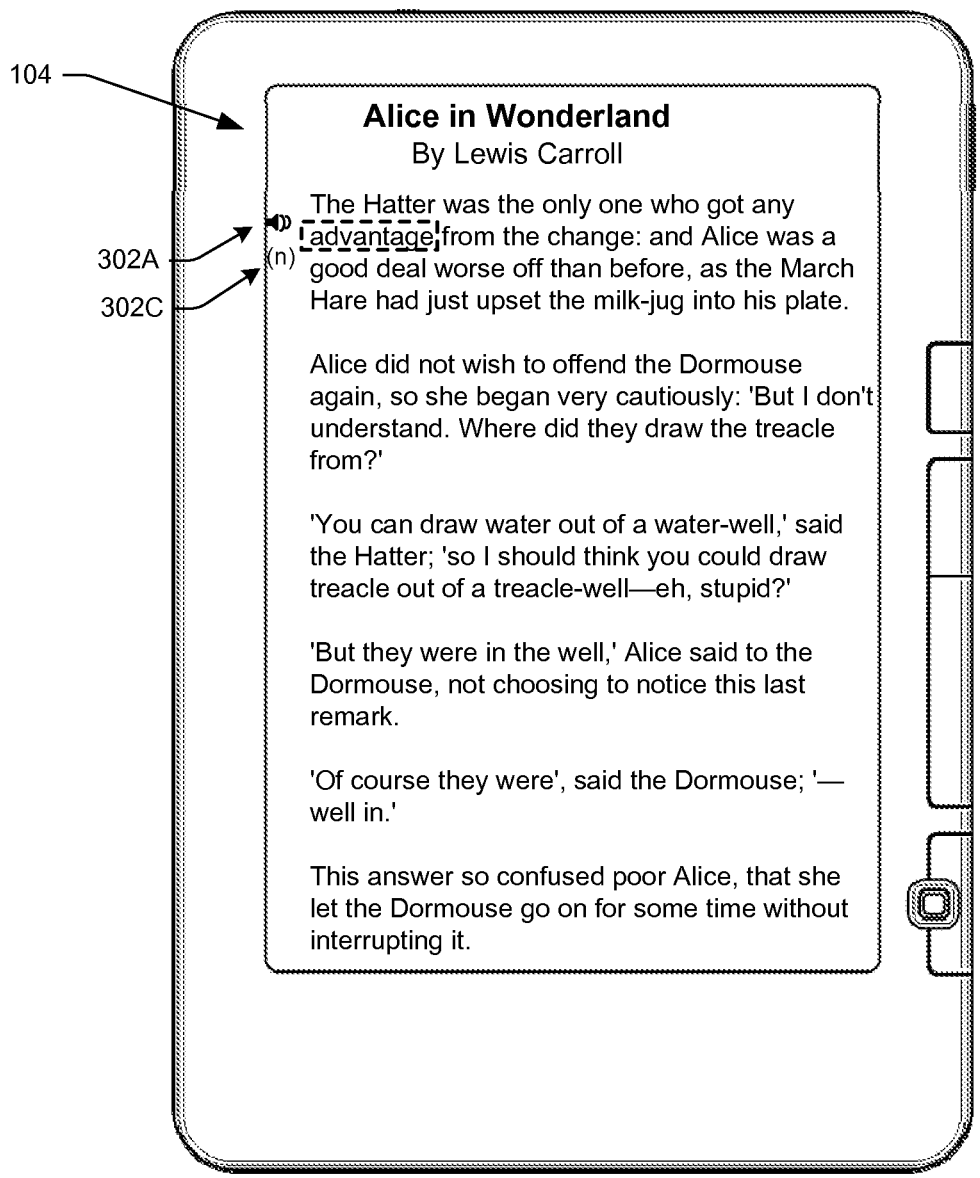

FIG. 3F illustrates another example dictionary user interface 124 customized for a particular user 102. As illustrated, this screen display includes the previously-described definition of the selected word 122. Here, however, the screen display includes a display of two different display elements 302 inline with the content item 104.

In the current example, display elements 302A and 302C are displayed near the selected word 122. The display elements 302A and 302C may be displayed by the device 106 utilizing the dictionary module 216.

While a few example dictionary UIs have been illustrated, it is to be appreciated that the devices 106 can display any other number of combinations of display elements for users. Furthermore, FIGS. 3A-3F illustrate that the displayed UI 124 has been tailored to user of the device 106. As discussed above, these modifications may be based on one or a variety of factors.

Example Processes

Figure 4:
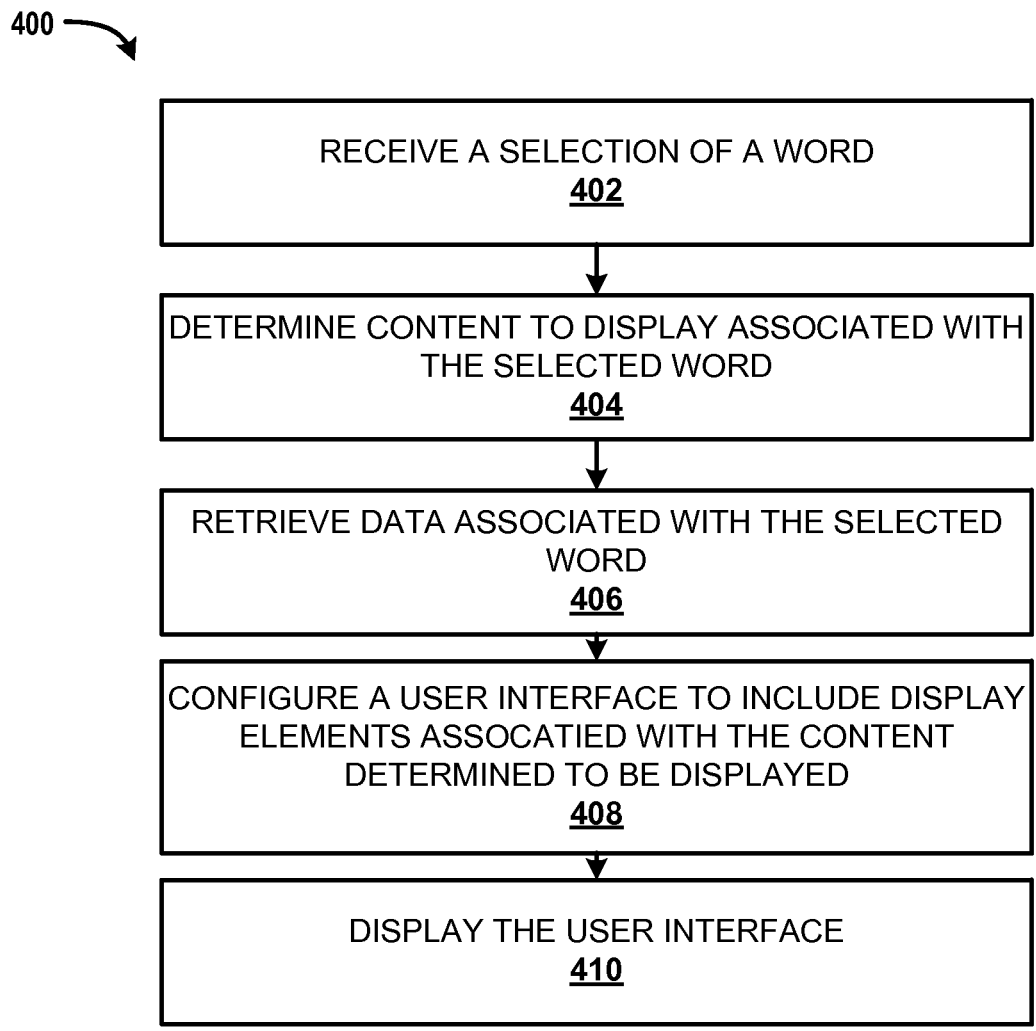
FIG. 4 is an example flow diagram showing an illustrative process for displaying a dictionary user interface customized for a user.
Figure 5:
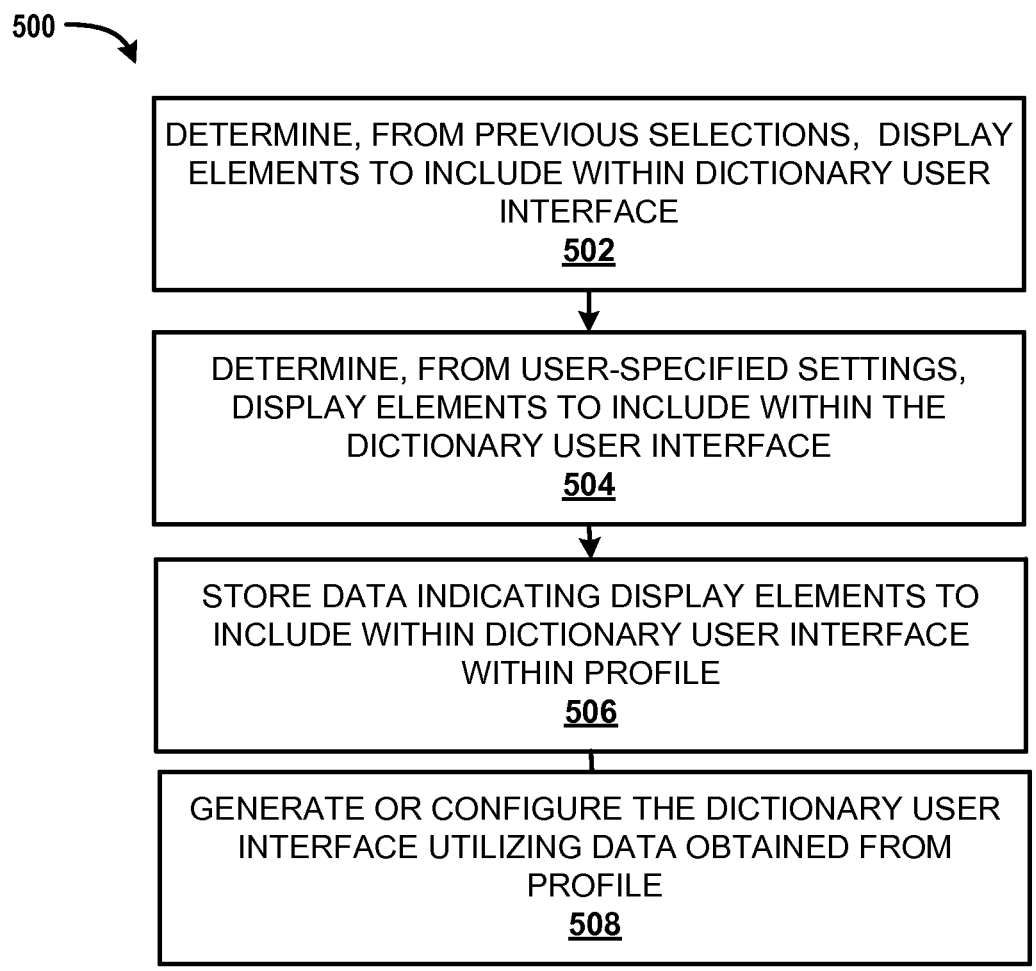
FIG. 5 is an example flow diagram showing an illustrative process for determining what display elements to display within the dictionary user interface from user interactions or user-specified settings.

FIGS. 4 and 5 are flow diagrams of respective example processes 400 and 500 for implementing the techniques described herein. Each of these processes is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 is an example flow diagram showing an illustrative process 400 for displaying a dictionary UI 124 customized for a user. In this example, the computing device 106 might be used to determine the display elements 302 to display within the dictionary UI 124. The process 400 might be performed in part by a user, by the electronic device 106, or by some other component or computing device.

At 402, a selection of at least one word within a content item, such as an electronic book, is received. For instance, a user of the electronic device 106 may select a particular word or a particular set of words via a touch screen, or any other input device or mechanism.

At 404, a determination is made as to what content to display that is related to the selected word. As discussed above, the display element selection component 218 may determine what display elements 302 to show within the UI 124 based on the user 102 that is utilizing the device 106. In some examples, the display element selection component 218 determines the content to display based, at least in part, on the profile 126 that is associated with the user 102 who selected the word.

At 406, data is retrieved that is associated with the selected word. As discussed above, the device 106 may retrieve a definition of the word from a dictionary (or some other data source) and may retrieve other data. For example, the dictionary module 216 may identify one or more example sentences (or portions of sentences or passages) that include the selected word. These sentences may be identified from content items that are associated with the user or the device, such as from content items that the user has previously acquired. These sentences may be displayed within the dictionary UI 124 when determined by the display element selection component 218.

At 408, the dictionary UI 124 is configured to include the display elements as determined at operation 404. As discussed above, each user 102 may specify different display elements to display within the dictionary UI 124. In some examples, the dictionary module 216 may generate the dictionary UI or some other component or computing device may generate the dictionary UI 124.

At 410, the dictionary UI 124 is displayed on the electronic device 106. As discussed above, the dictionary UI 124 may be displayed as a separate window on the display or may be displayed within the same window as the content item 104.

FIG. 5 is an example flow diagram showing an illustrative process 500 for determining what display elements to display within the dictionary UI 124 from user interactions or user-specified settings. In this example, the computing device 106 might be used to determine the display elements 302 to display within the dictionary UI 124. The process 500 might be performed in part by a user, by the computing device 106, or by some other component or computing device.

At 502, the display elements to include in the dictionary UI 124 are determined from previous selections and interactions the user 102 has made with a previously displayed dictionary UI 124. As discussed above, a machine learning mechanism may be used to determine the display elements that a user 102 is interested in viewing. In other examples, the display elements that the user 102 is interested in viewing may be determined using selections and interactions determined from similar users (e.g., users exhibiting similar patterns or interests).

At 504, the display elements to include within the dictionary UI 124 may be determined from user specified settings. As discussed above, a user may specify settings as to what display elements to include within the dictionary UI 124 as well as how to display the specified display elements.

At 506, the data is indicating the display elements to include within the dictionary UI 124 is stored within a profile. As discussed above, a separate profile may be associated with each user 102 of the device 106. In some examples, the profile may be obtained from a remote storage location and/or stored on the device 106.

At 508, the dictionary user interface is generated and/or configured utilizing the profile. As discussed above, the dictionary UI 124 may be generated by the device 106 or generated by a remote computing device and provided to the device 106 for display.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method, comprising:
receiving an indication of a word selected by a first user from an electronic book being displayed by an electronic book reader;
accessing profile data that is specific to the first user, the profile data including at least one of a demographic characteristic or a user preference associated with the first user;
identifying one or more second users having at least one of a shared demographic characteristic or a shared user preference with the first user;
accessing profile data that is specific to the one or more second users, the profile data identifying a history of one or more selections of individual ones of a plurality of user interface elements to display within a dictionary user interface presented to the one or more second users, the plurality of user interface elements including one or more of a first user interface element associated with a definition of the word, a second user interface element associated with a part of speech associated with the word, a third user interface element associated with audio data related to the word, a fourth user interface element associated with an example sentence that includes the word, a fifth user interface element associated with a related word, or a sixth user interface element associated with graphical content related to the word;
determining, based at least in part on the history, one or more user interface elements of the plurality of user interface elements to display within the dictionary user interface;
retrieving, based at least in part on the determined one or more user interface elements, dictionary data, the dictionary data including one or more of the definition of the word, the part of speech associated with the word, the audio data, the example sentence, the related word, or the graphical content;
rendering at least a portion of the dictionary data within the determined one or more user interface elements; and
providing the dictionary user interface including the determined one or more user interface elements for display on the electronic book reader.

2. The method of claim 1, wherein retrieving the dictionary data comprises:
searching an index for content items that include the word, the index created from content accessed by the first user and stored on one or more of a storage of the electronic book reader or a content item service;
ranking the content items that include the word according to a number of occurrences of the word within individual ones of the content items; and
retrieving the dictionary data from at least one of the content items based, at least in part, on the ranking.

3. The method of claim 1, wherein the determining the one or more user interface elements comprises:
accessing data that describes interactions with the dictionary user interface, the interactions comprising selections by the first user of the plurality of user interface elements within instances of the dictionary user interface;
identifying, from the data, a number of previous selections by the first user of individual ones of the plurality of user interface elements;
learning an association between the first user and the number of previous selections; and
determining the one or more user interface elements further based at least in part on the association.

4. The method of claim 1, further comprising:
identifying a native language utilized by the first user, the native language identified based, at least in part, on a determination of a language for individual content items stored on the electronic book reader; and translating at least a portion of data associated with one or more of the plurality of user interface elements from a first language used to display the word within the electronic book to the native language.

5. An electronic device, comprising:

one or more processors;

a display; and a computer-readable media storing computing executable instructions that, when executed by one or more processors, cause the one or more processors to perform acts, including:

receiving an indication of a word selected by a first user to be defined within a dictionary user interface;

accessing profile data that is specific to the first user, the profile data including at least one of a demographic characteristic or user preference associated with the first user;

identifying one or more second users having at least one of a shared demographic characteristic or a shared user preference with the first user;

accessing profile data that is specific to the one or more second users, the profile data indicating a history of selections of individual ones of a plurality of user interface elements to include within the dictionary user interface;

determining, based at least in part on the history, one or more user interface elements of the plurality of user interface elements to display within the dictionary user interface;

identifying, based at least in part on the determined one or more user interface elements, data, the data including one or more of a definition of the word, a part of speech for the word, an example sentence related to the word, a related word, auditory data related to the word, or graphical content related to the word; and providing the dictionary user interface for display, the dictionary user interface including the determined one or more user interface elements that when displayed present at least a portion of the data.

6. The electronic device of claim 5, wherein the plurality of user interface elements include two or more of a first user interface element associated with the definition of the word, a second user interface element associated with the part of speech for the word, a third user interface element associated with the auditory data related to the word, a fourth user interface element associated with the example sentence, a fifth user interface element associated with the related word, or a sixth user interface element associated with the graphical content related to the word.

7. The electronic device of claim 6, wherein the acts further comprise using an index generated from electronic books acquired by the first user to identify an example sentence that includes the word.

8. The electronic device of claim 7, wherein the acts further comprise accessing data of the electronic books acquired by the first user, generating the index using the data of the electronic books; and searching the index to identify example sentences that includes the word, and selecting the example sentence from the example sentences.

9. The electronic device of claim 5, wherein retrieving the dictionary data comprises retrieving a first portion of the dictionary data from a dictionary file and retrieving a second portion of the data from one or more electronic book files.

10. The electronic device of claim 5, wherein receiving the indication of the word to be defined comprises receiving an indication that the word is selected from an electronic book.

11. The electronic device of claim 5, wherein the acts further comprise identifying graphical content stored within one or more of a storage of the electronic device or a storage of a content item service associated with the first user.

12. The electronic device of claim 5, wherein the acts further comprise providing a selectable user interface element within the dictionary user interface that when selected changes an appearance of the dictionary user interface.

13. The electronic device of claim 5, wherein the determining the one or more user interface elements comprises:

using a classification mechanism that classifies user interface elements based, at least in part, on a number of previous selections by the first user of individual ones of the plurality of user interface elements;

learning an association between the first user and the number of previous selections; and determining the one or more user interface elements further based at least in part on the association.

14. The electronic device of claim 5, wherein the acts further comprise translating at least a portion of the data to a language that is different from a display language used to display the word.

15. The electronic device of claim 5, wherein the acts further comprise selecting an example sentence that includes the word based, at least in part, a frequency of the word occurring within content items previously accessed by the first user.

16. A system, comprising:

memory; and one or more processors coupled to the memory, the one or more processors operative to:

receive an indication of a word selected by a first user within a content item;

access profile data that is specific to the first user, the profile data including at least one of a demographic characteristic or user preference associated with the first user;

identify one or more second users having at least one of a shared demographic characteristic or a shared user preference with the first user;

access profile data that is specific to the one or more second users, the profile data indicating a history of selections of individual ones of a plurality of user interface elements to display within a dictionary user interface, the plurality of user interface elements associated with content related to the word;

determine, based at least in part on the history, one or more user interface elements of the plurality of user interface elements to display;

identify, based at least in part on the determined one or more user interface elements, data, the data including one or more of a definition of the word, a part of speech for the word, an example sentence related to the word, a related word, auditory data related to the word, or graphical content related to the word; and provide at least a portion of the data for display.

17. The system of claim 16, wherein to provide the at least the portion of the data for display comprises sending the dictionary user interface to a display of an electronic book reader, the dictionary user interface including the determined one or more user interface elements configured to present the at least the portion of the data.

18. The system of claim 17, wherein the user interface elements include two or more of a first user interface element associated with the definition of the word, a second user interface element associated with the part of speech for the word, a third user interface element associated with the auditory data related to the word, a fourth user interface element associated with the example sentence, a fifth user interface element associated with the related word, or a sixth user interface element associated with the graphical content related to the word.

19. The system of claim 16, wherein to receive the indication of the word selected by the first user comprises receiving an indication that the word is selected from an electronic book.

20. The system of claim 16, wherein to determine the one or more user interface elements is further based at least in part on a number of previous selections by the first user of individual ones of the plurality of user interface elements.

21. The system of claim 16, further comprising translating a first portion of the at least the portion of the data from a first language used to display the word to a second language.

22. The system of claim 16, wherein to identify data comprises:

identifying content items acquired by the first user that include the word; and retrieving content from one or more of the content items based, at least in part, on a last access time to individual ones of the content items.

23. The system of claim 16, wherein the profile data that is specific to the first user includes one or more selections of individual ones of the plurality of user interface elements, the one or more selections including first data that identifies a first user interface element to include within the dictionary user interface and second data that identifies a second identification of a second user interface element to include within the user interface, wherein the first user interface element and the second user interface element are based at least in part on previous selections associated with the first user.

\* \* \* \* \*